(12) United States Patent
Lessard

(10) Patent No.: US 8,714,525 B2
(45) Date of Patent: May 6, 2014

(54) PORTABLE MANIPULATOR FOR CARRYING OUT WORKS ON ENERGIZED OVERHEAD ELECTRICAL LINES

(75) Inventor: André Lessard, Sainte-Julie (CA)

(73) Assignee: Hyrdo-Quebec, Montreal, Quebec (CA)

( * ) Notice: Subject to any disclaimer, the term of this patent is extended or adjusted under 35 U.S.C. 154(b) by 487 days.

(21) Appl. No.: 12/735,518

(22) PCT Filed: Jan. 26, 2009

(86) PCT No.: PCT/CA2009/000050
§ 371 (c)(1),
(2), (4) Date: Sep. 7, 2010

(87) PCT Pub. No.: WO2009/094747
PCT Pub. Date: Aug. 6, 2009

(65) Prior Publication Data
US 2011/0011987 A1    Jan. 20, 2011

(51) Int. Cl.
*H02G 1/02* (2006.01)
*H02G 1/00* (2006.01)

(52) U.S. Cl.
CPC ... *H02G 1/02* (2013.01); *H02G 1/00* (2013.01)
USPC ............ 254/134.3 PA; 254/134.3 R; 294/174

(58) Field of Classification Search
CPC ........... E04H 12/22; E04H 12/24; F16L 3/00; F16L 3/01; F16L 3/015; H02G 1/00; H02G 1/02; H02G 1/04; H02G 7/20
USPC ...... 174/40 R, 45 R; 212/199, 204, 314, 315; 248/49; 254/49, 84, 85, 134.3 PA, 254/134.3 R; 414/27, 589
See application file for complete search history.

(56) References Cited

U.S. PATENT DOCUMENTS

| 20,675 | A | * | 6/1858 | White | 254/85 |
|---|---|---|---|---|---|
| 724,587 | A | * | 4/1903 | Kofske | 254/85 |
| 1,050,004 | A | * | 1/1913 | Cronin | 294/174 |
| 1,131,018 | A | * | 3/1915 | Troutman | 254/85 |
| 1,190,163 | A | * | 7/1916 | Hedman | 254/85 |
| 1,793,732 | A | * | 2/1931 | Bodendieck | 294/174 |
| 1,793,733 | A | * | 2/1931 | Bodendieck | 294/174 |
| 1,853,600 | A | * | 4/1932 | Bodendieck | 254/98 |
| 1,907,024 | A | * | 5/1933 | Willard et al. | 254/93 R |
| 1,979,688 | A | * | 11/1934 | Hamer | 294/174 |
| 2,001,034 | A | * | 5/1935 | Mosher | 248/539 |
| 2,662,730 | A | * | 12/1953 | Crawford | 254/134.3 PA |
| 2,738,077 | A | * | 3/1956 | Ingvertsen | 211/107 |
| 3,070,355 | A | * | 12/1962 | Wyatt | 254/134.3 R |
| 3,490,605 | A | * | 1/1970 | Koss | 212/175 |
| 4,174,678 | A | | 11/1979 | Van Den Bergh | |
| 4,337,868 | A | * | 7/1982 | Gattu | 212/348 |

(Continued)

*Primary Examiner* — Saul Rodriguez
*Assistant Examiner* — Brendan Tighe
(74) *Attorney, Agent, or Firm* — Muirhead and Saturnelli, LLC

(57) ABSTRACT

A manipulator for lifting conductors of an energized electrical line from a first pole to a second pole. The manipulator has a vertical lifting assembly on which a transverse displacement assembly is mounted. The vertical lifting assembly is attachable to one of the poles by a fastening assembly. The transverse displacement assembly has a mobile element provided with a number of insulators on which conductor holders for receiving the conductors of the electrical line to be lifted are mounted. The transverse displacement of the mobile element and the displacement of another mobile element of the lifting assembly are achieved by motor units controlled by a control unit.

16 Claims, 7 Drawing Sheets

(56) References Cited

U.S. PATENT DOCUMENTS

| | | | |
|---|---|---|---|
| 4,466,506 A * | 8/1984 | Dolenti | 182/2.1 |
| 5,076,449 A * | 12/1991 | Clutter | 212/283 |
| 5,538,207 A * | 7/1996 | O'Connell et al. | 248/49 |
| 6,837,671 B2 * | 1/2005 | Devine et al. | 414/680 |
| 8,226,069 B2 * | 7/2012 | Devine et al. | 254/134.3 PA |
| 8,585,020 B2 * | 11/2013 | Devine et al. | 254/134.3 PA |
| 2001/0016087 A1 * | 8/2001 | Akiyama et al. | 384/17 |
| 2010/0133490 A1 * | 6/2010 | Devine et al. | 254/134.3 PA |
| 2011/0011987 A1 * | 1/2011 | Lessard | 248/49 |
| 2012/0175575 A1 * | 7/2012 | Devine et al. | 254/134.3 PA |
| 2012/0286108 A1 * | 11/2012 | Devine et al. | 248/68.1 |

\* cited by examiner

PORTABLE MANIPULATOR FOR CARRYING OUT WORKS ON ENERGIZED OVERHEAD ELECTRICAL LINES

FIELD OF THE INVENTION

The invention generally relates to works on energized (live) overhead electrical lines, and more particularly to a portable manipulator possibly operable by remote control for carrying out works such as a transfer of an energized electrical line from an old pole to a new pole or a replacement of a crossarm or another piece of equipment on a pole of an energized electrical line.

BACKGROUND

Overhead distribution electrical networks comprise a large number of poles. When these poles reach the end of their life, they must be replaced. The transfer of a three-phase line (or having a different number of phases) from an old pole to a new pole requires to raise and move the medium voltage conductors. To avoid electrical supply interruption, this transfer is generally made while the line is live, which requires specific safety procedures.

The transfer of an energized overhead electrical line can be carried out from a distance using one or several sticks. The transfer of the conductors is carried out by installing a temporary support (two supports are sometimes necessary) onto which the conductors are transferred one by one. The existing crossarm on the pole to be replaced is then dismantled, and a crossarm is installed on the new pole. The conductors are then again transferred one by one on the new crossarm, and the temporary support is dismantled. The procedure is thus limited to the displacement of a single conductor at once and requires the installation of one or two supports to temporarily support the conductors.

In locations unreachable to a bucket truck, the handling of the live electrical conductors must be manually carried out from a distance with insulating sticks. This type of work is strenuous on the physical level and takes a long time. In the case where the line is located in a location reachable to a bucket truck, the handling of the conductors can be carried out using the fly jib of the truck. In both cases, temporary supports must be installed.

When the location is reachable, there are certain devices allowing simultaneous raising and displacement of the conductors of a three-phase line. Examples of such devices are shown in U.S. Pat. No. 4,466,506 (Dolenti) and U.S. Pat. No. 5,076,449 (Clutter). In these devices, a temporary crossarm is carried by an arm sliding in a support mounted to the bucket of a bucket truck. The crossarm has brackets for receiving the conductors to be moved. The brackets are actuated through a stick by an operator stationed in the bucket, under the conductors which are possibly live. The bucket truck must have a strong lift capacity and is generally not usable in backyards. Certain safety problems may happen in case of emergency. For example, the bucket cannot be easily and quickly lowered back to ground because the conductors are captured in the conductor holders. Furthermore, the mechanical load produced by the lifting of the conductors may exceed the lift capacity of the bucket truck. U.S. Pat. No. 5,538,207 (O'Connell et al.) shows a similar device but directly mounted at the end of the boom of a truck.

SUMMARY

An object of the present invention is to provide a portable manipulator which can raise and move energized conductors of an overhead electrical line.

Another object of the present invention is to provide such a manipulator which can be fastened to the head of a pole and does not require using a bucket truck.

According to an aspect of the present invention, there is provided a manipulator for lifting at least one conductor of an energized electrical line from a pole, comprising:
  a lifting assembly having a first mobile element movable between a lowered position and a raised position;
  a first motor unit coupled to the lifting assembly so as to controllably move the first mobile element between the lowered position and the raised position;
  a fastening assembly for fastening the lifting assembly to the pole so that a displacement of the first mobile element follows a displacement axis parallel to the pole to which the lifting assembly is fastened;
  a transverse displacement assembly mounted on the first mobile element, the transverse displacement assembly having a second mobile element movable along a transverse axis with respect to the displacement axis of the first mobile element, the second mobile element being provided with at least one upwardly projecting insulator and at least one conductor holder mounted on the at least one insulator for receiving the at least one conductor of the electrical line to be lifted;
  a second motor unit coupled to the second mobile element so as to controllably move the second mobile element along the transverse axis; and
  a control unit for controlling the first and second motor units.

BRIEF DESCRIPTION OF THE DRAWINGS

A detailed description of the preferred embodiments of the invention will be given below in reference with the following drawings, in which the same numerals refer to identical or similar elements.

DETAILED DESCRIPTION OF THE PREFERRED EMBODIMENTS

In the present disclosure, unless indicated otherwise, the term "energized" refers to electrical energy.

Figure 1:
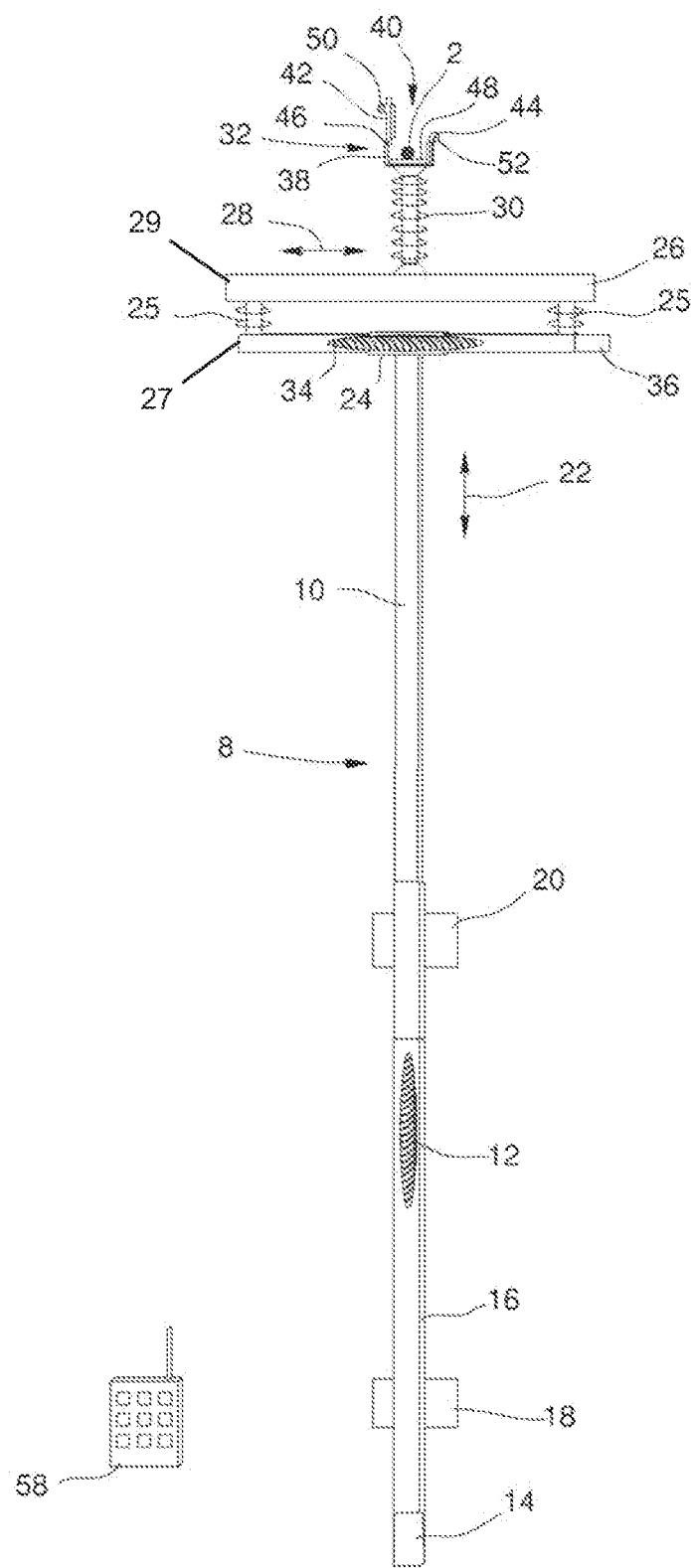
FIG. 1 is a schematic elevation diagram of a manipulator with a single conductor holder according to the invention.
Figure 2:
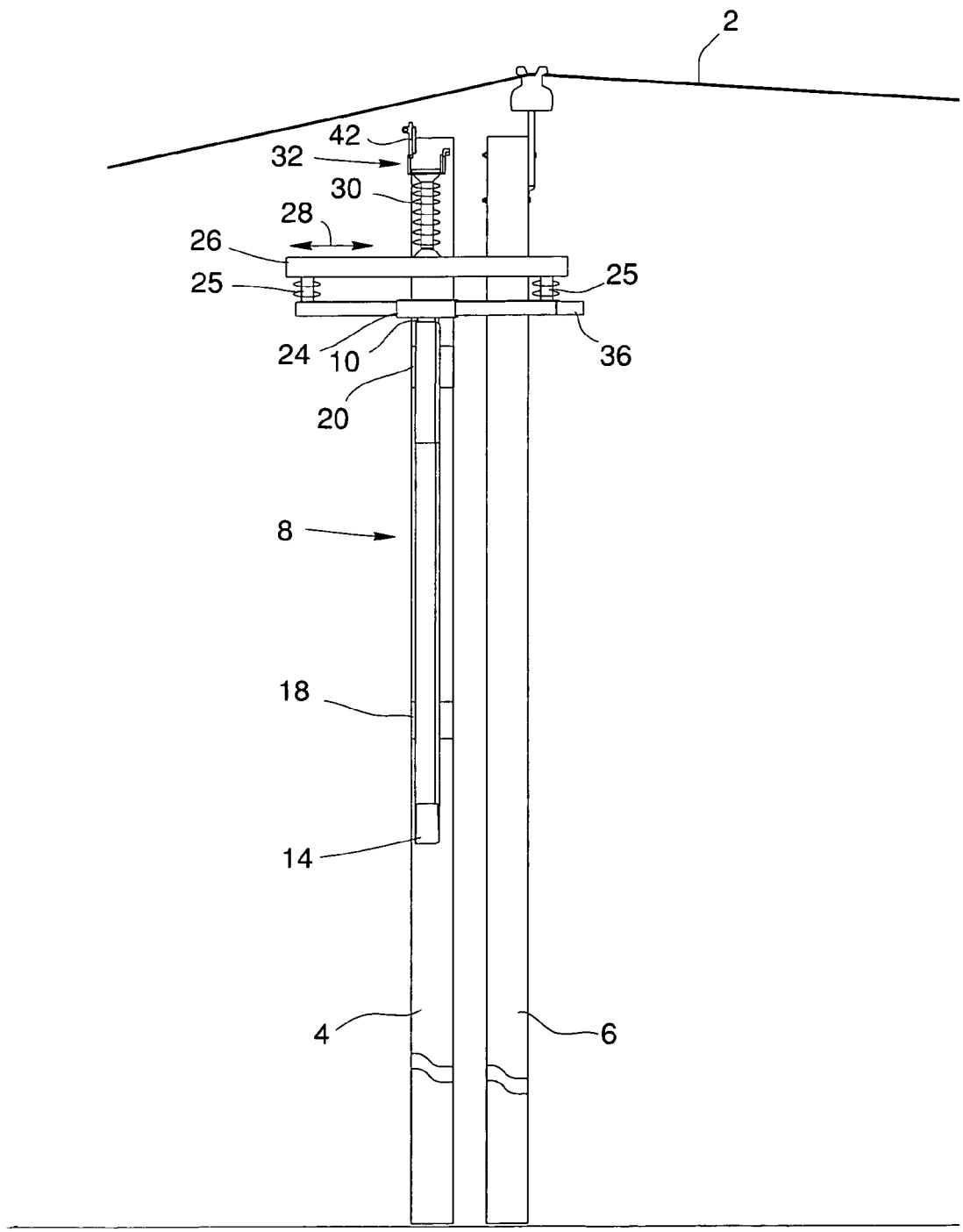
FIGS. 2 and 3 are schematic elevation diagrams of a manipulator with a single conductor holder at different stages during transfer of an energized electrical line conductor.
Figure 3:
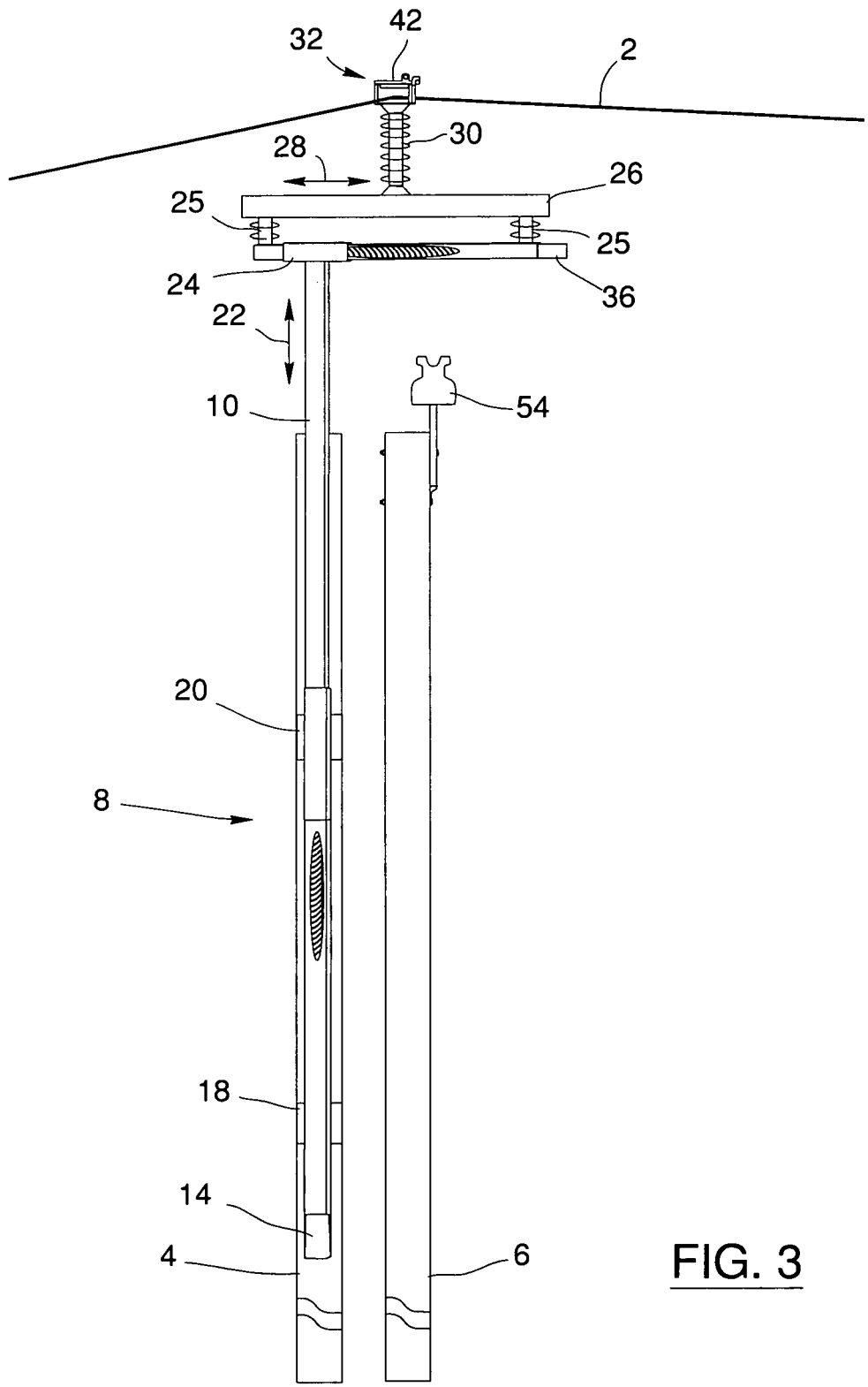
Figure 4:
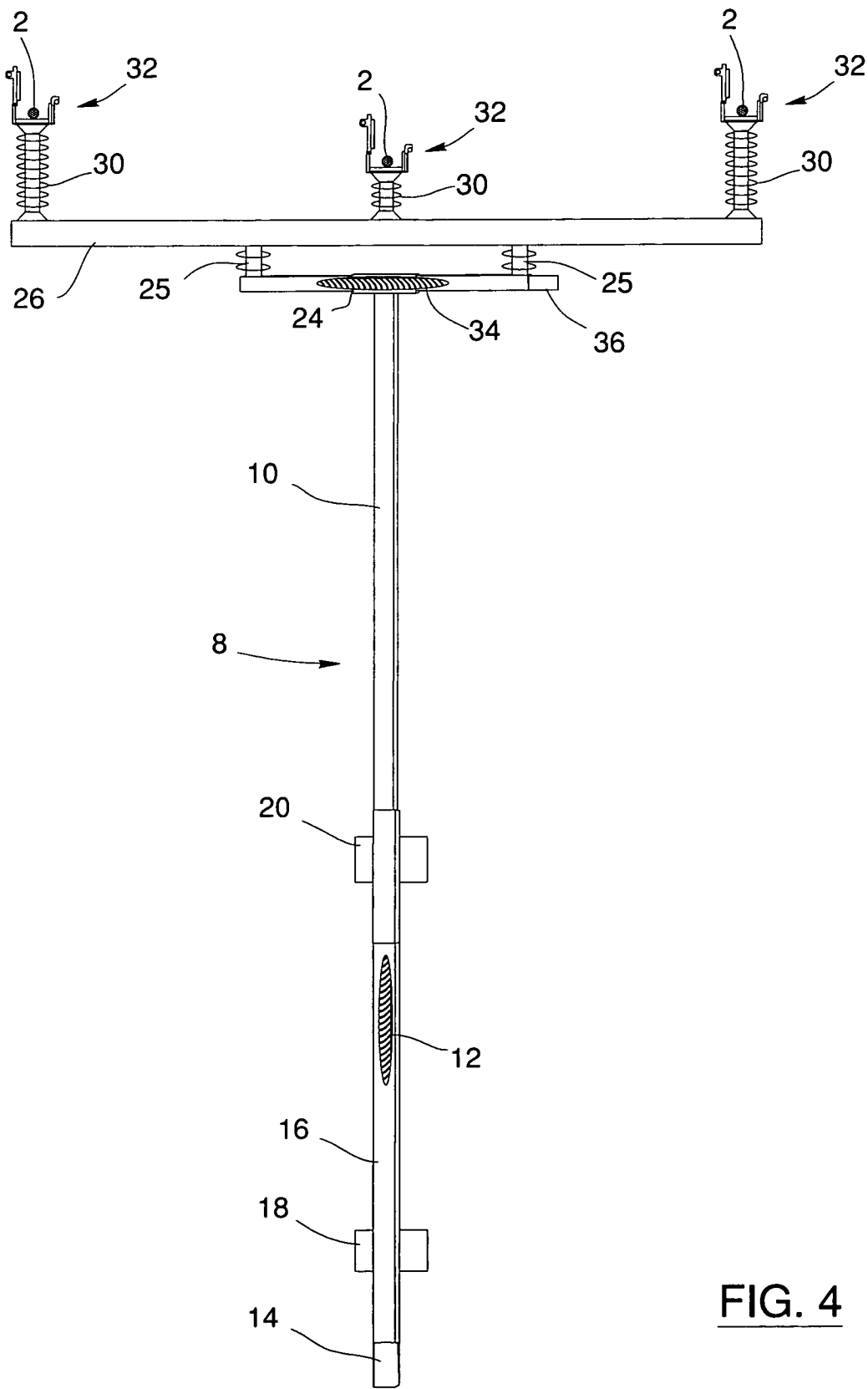
FIG. 4 is a schematic elevation diagram of a manipulator with multiple conductor holders according to the invention.

Referring to FIGS. 1, 2 and 3, there is shown a manipulator according to the present invention. The manipulator allows lifting a conductor 2 of an energized electrical line from a pole 4 (shown in FIGS. 2 and 3) or yet carrying out other types of works such as transferring a conductor 2 of an energized electrical line from an old pole 6 (shown in FIGS. 2 and 3) to a new pole 4 (shown in FIGS. 2 and 3). The manipulator comprises a lifting assembly such as formed of a telescopic arm 8 having an upper member 10 sliding in a lower member 16 constituting a stationary element. The upper member 10 thus forms a first mobile element movable between a lowered position such as illustrated in FIG. 2, and a raised position such as illustrated in FIG. 3. The mobile element 10 may be made of several telescopically mounted upper members if desired (arrangement not shown).

A first motor unit, such as formed of an endless screw arrangement 12 extending in the telescopic arm 8 and a motor 14 coupled to the endless screw arrangement 12 to drive it in rotation, is coupled to the lifting assembly so as to controllably move the first mobile element (upper member) 10 between the lowered position and the raised position. The upper member 10 of the telescopic arm 8 is to that purpose coupled to the endless screw arrangement 12 so that a rotation of the endless screw arrangement 12 produces a corresponding displacement of the upper member 10 between the raised position and the lowered position, a direction of the displacement depending on the direction of rotation of the endless screw arrangement 12.

The motor 14 may advantageously be positioned at a lower end of the telescopic arm 8. The motor 14 may nevertheless be positioned otherwise, for example along or inside the telescopic arm 8.

The manipulator has pole saddles 18, 20 spaced from each other along the stationary element 16 of the lifting assembly, forming a fastening assembly for fastening the lifting assembly to one of the poles 4, 6 so that a displacement of the first mobile element 10 follows a displacement axis parallel to the pole 4, 6 to which the lifting assembly is fastened, such as illustrated by arrows 22. The fastening assembly can also be formed of clamps, fasteners or other similar pieces of equipment if desired, provided that it allows firm fastening of the manipulator to the pole 4 or to members or elements of a structure or frame playing the role of a pole. In this sense, the term "pole" must be considered as including such a structure or frame.

A transverse displacement assembly comprising a guiding unit such as a sleeve 24 slideably receiving and guiding a second mobile element 26, is mounted on the first mobile element (upper member) 10. The second mobile element 26 is thus movable following a transverse axis with respect to the displacement axis of the first mobile element 10, such as illustrated by arrows 28. FIGS. 2 and 3 show an example of transverse displacement of the second mobile element 26 at two different transverse positions with respect to the axis of the first mobile element 10. The second mobile element 26 is provided with an upwardly projecting insulator 30 and a conductor holder 32 mounted on the insulator 30 for receiving the conductor 2 of the electrical line to be lifted.

A second motor unit, such as formed of an endless screw arrangement 34 extending along the transverse axis and a motor 36 coupled to the endless screw arrangement 34 to drive it in rotation, is coupled to the second mobile element 26 so as to controllably move the second mobile element 26 along the transverse axis. The second mobile element 26 is to that purpose coupled to the endless screw arrangement 34 so that a rotation of the endless screw arrangement 34 produces a corresponding displacement of the mobile element 26 with respect to the guiding unit (the slide 24), a direction of the displacement depending on the direction of rotation of the endless screw arrangement 34.

The motor 36 may advantageously be disposed at an end of the second mobile element 26, the endless screw arrangement 34 then extending in the second mobile element 26 and engaging with the sleeve (slide) 24. The motor 36 may nevertheless be disposed otherwise, for example on the sleeve 24, depending on the mechanism used to produce the displacement of the mobile element 26.

The second mobile element 26 is preferably made of lower 27 and upper 29 members spaced from each other, and electrically insulating elements 25 extending between the lower and upper members 27, 29, the insulator 30 being mounted on the upper member 29 of the second mobile element 26.

The construction of the above described lifting assembly, the transverse displacement assembly and the motor units has the advantage of being compact and of little bulk in the sense that it reduces the risks of collision with elements external to the manipulator. The endless screw arrangement 12 also has the advantage of providing a simple mechanism for locking the upper member 10 of the telescopic arm 8 in its current position for example in a case of a failure of the motor 14. A braking mechanism such as a magnetic brake or another one (not shown) may also be used for that purpose if desired, depending on the construction of the lifting assembly and the first motor unit. The lifting and transverse displacement assemblies and the motor units may also be constructed otherwise if desired. For example, a slide, track, jack or other system (not shown) may be used instead of the telescopic arm 8. A slide, rack, jack or other system (not shown) may also be used instead of a sleeve 24. A gearing, rack, pulley, pneumatic, hydraulic or other system (not illustrated) disposed inside or outside the lifting assembly or the transverse displacement assembly can also be used instead of the endless screw arrangements 12, 34. The motors 14, 36 may be electric or otherwise, according to the driving systems used to move the telescopic arm 8 and the mobile element 26.

The conductor holder 32 comprises a fork 38 having an upper opening 40 intended to receive the conductor 2, and preferably a mobile locking element, such as a door 42 pivotally mounted on one side of the fork 38, operable to selectively open and close the opening 40 of the fork 38 to prevent the conductor 2 from disengaging the conductor holder 32 during a lifting operation of the conductor 2. The conductor holder 32 also comprises a mobile hook 44 extending on one side of the fork 38 opposite to the pivot of the door 42. The door 42 is pivotable between an open position wherein the door 42 unblock the opening 40 of the fork 38, and a close position wherein the door 42 engages with the mobile hook 44 (such as illustrated in FIG. 2) to close the opening 40 of the fork 38. The mobile hook 44 is operable between a lock position wherein the mobile hook 44 maintains the door 42 in the close position and a release position wherein the mobile hook 44 releases the door 42. The door 42 is preferably mounted on a spring hinge 46 exerting a return pressure on the door 42 towards the open position.

The conductor holder 32 may also have a configuration (not shown) exhibiting a counterweight or spring door extending across the opening 40 of the fork 38, tiltable downwards to allow engagement of the conductor 2 in the fork 38, and self-tiltable upwards in position of blocking the opening 40, in a similar fashion to the configuration illustrated in U.S. Pat. No. 4,466,506 (Dolenti).

The conductor holder 32 preferably has a transverse roller 48 in the fork 38 so as to allow an axial displacement of the conductor 2 in the conductor holder 32.

The door 42 may also be slideably mounted to clear or close the opening 40 instead of pivoting. The door 42 and the mobile hook 44 may exhibit holes 50, 52 adapted to receive an actuation pin disposed at the end of a stick (not shown).

The conductor holder 32 may be rotatably mounted on the insulator 30 to allow following the angle of the conductor 2 during the transfer.

The second mobile element 26 (or a part thereof) may take the form of a crossarm removably mounted to the transverse displacement assembly, so as to be usable as permanent crossarm on the pole 4. The mobile crossarm is preferably made in insulating material.

The manipulator also comprises a control unit 58 for controlling the motor units. The control unit 58 is preferably in the form of a remote control and the motor units are responsive to control signals transmitted by the remote control. To that purpose, the lifting and transverse displacement assemblies may be provided with batteries and receivers (not shown). Thus, the operator preserves his/her freedom of movement and there are no possibly hindering wires to be carried with the manipulator. This also allows the lineman to move away from the work area during the lifting of the conductors 2. The control of the motor units may still also be achieved using wires (not shown) if desired.

The above described manipulator may be used for the transfer of a conductor of a single phase electrical line. It may also be used for the transfer of several conductors, for example of a three-phase electrical line, by proceeding with the successive transfers of the conductors.

To transfer an energized conductor 2 from a pole 6 to another one 4, the operator fastens the manipulator to the new pole 4, as illustrated in FIG. 2, and then operates the manipulator so as to position the conductor holder 32 in engaging position with the conductor 2 of the electrical line to be transferred. The door 42 is then closed and locked with the hook 44, and the conductor 2 is further lifted with the upper member 10 of the telescopic arm 8 to disengage it from the insulator 54 that bears it on the old pole 6, as illustrated in FIG. 3. The transverse displacement assembly is thereafter actuated to displace the conductor 2 towards the transfer position with a view to its installation on the insulator (not shown) of the new pole 4, and the upper member 10 of the telescopic arm 8 is subsequently lowered until the conductor 2 stands on the insulator. The door 42 is then opened and the manipulator is operated to return in initial position as illustrated in FIG. 2.

The manipulator may as well also be installed on the old pole 6 to perform the transfer, instead of the new pole 4. In such a case, the manipulator is operated to "deliver" the conductor 2 of the electrical line to be transferred from the old pole 6 to the new pole 4, rather than to "fetch" the conductor 2 of the old pole 6 to bring it to the new pole 4.

Referring to FIGS. 4, 5, 6 and 7, the manipulator according to the invention may also be used to simultaneously transfer several conductors 2, such as a three-phase or bi-phase arrangement. In such as case, several insulators 30 spaced from one another are disposed at respective positions on the second mobile element 26. Several conductor holders 32 are then also mounted on the respective insulators 30. Some or all the insulators 30 may be mounted on the mobile element 26 so that their respective positions are adjustable. The insulators 30 located at opposite ends of the second mobile element 26 preferably project higher than the other insulators 30. In the case of a three-phase electrical line, such a configuration allows disengaging the conductors 2 on each side of the line first, thereby allowing transverse displacement of the second mobile element 26 to position the center conductor holder 32 in alignment with the remaining center conductor 2 to be lifted.

Figure 5:
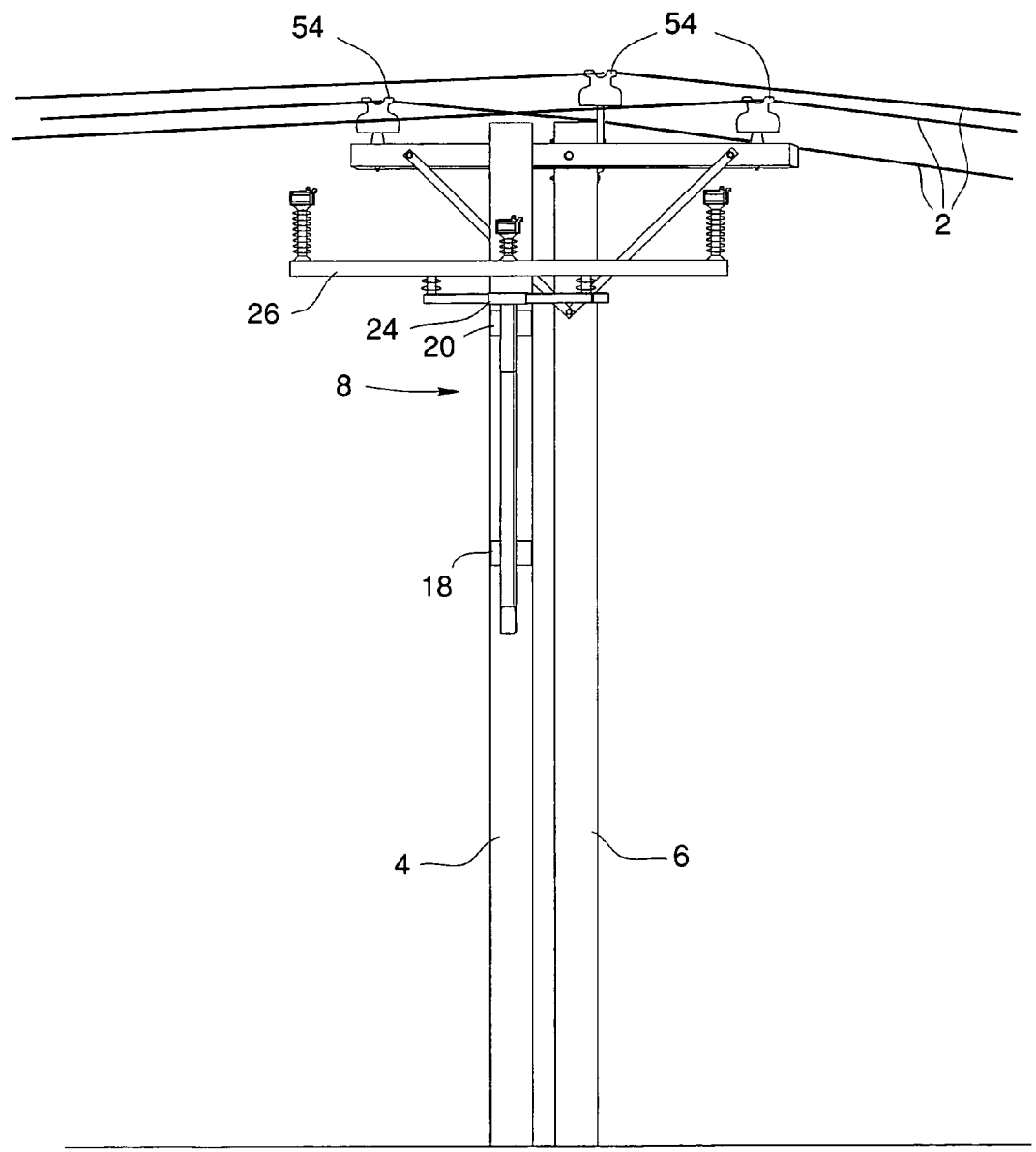
FIGS. 5, 6 and 7 are schematic elevation diagrams of a manipulator with multiple conductor holders at different stages during transfer of energized electrical line conductors.
Figure 6:
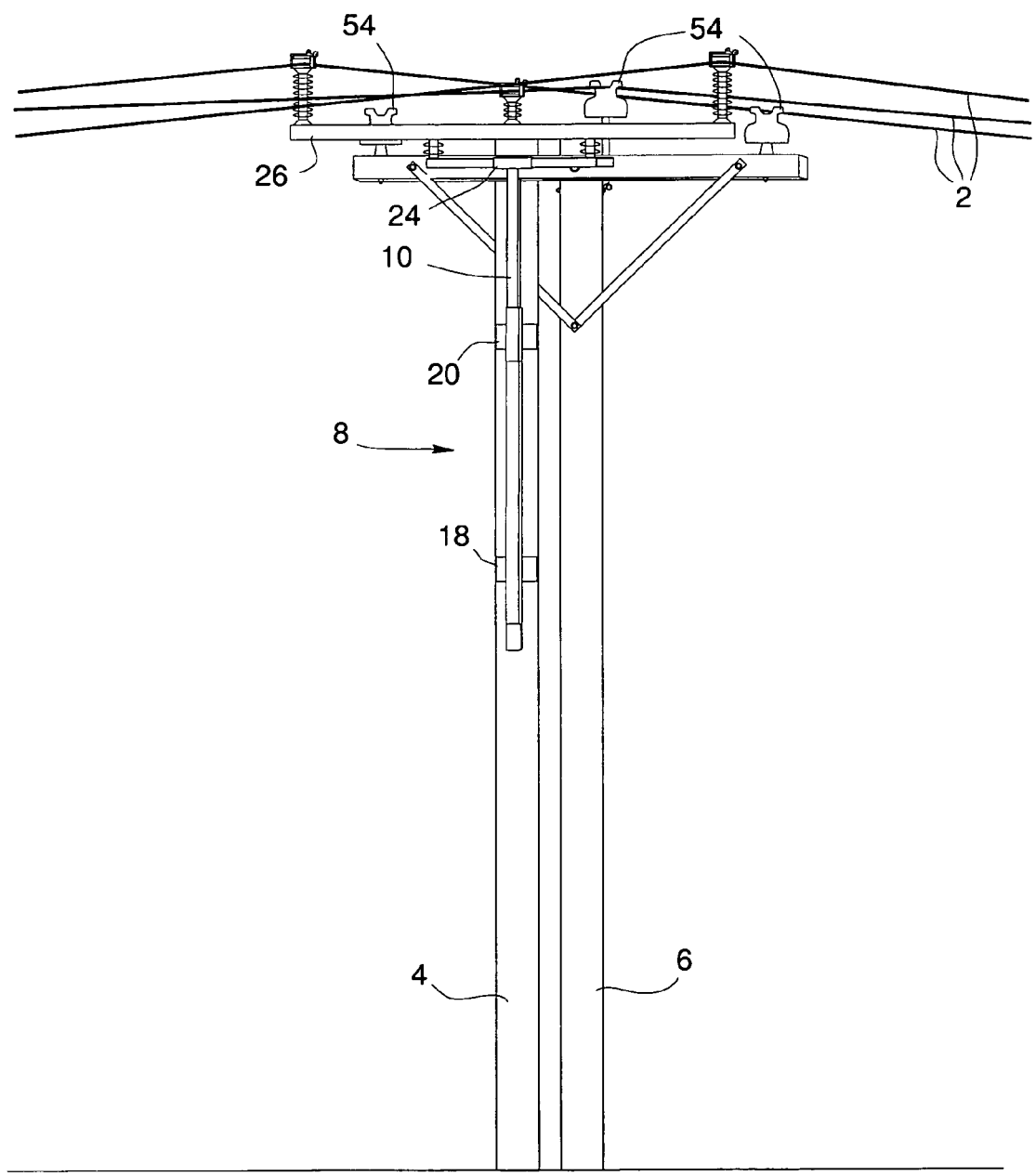
Figure 7:
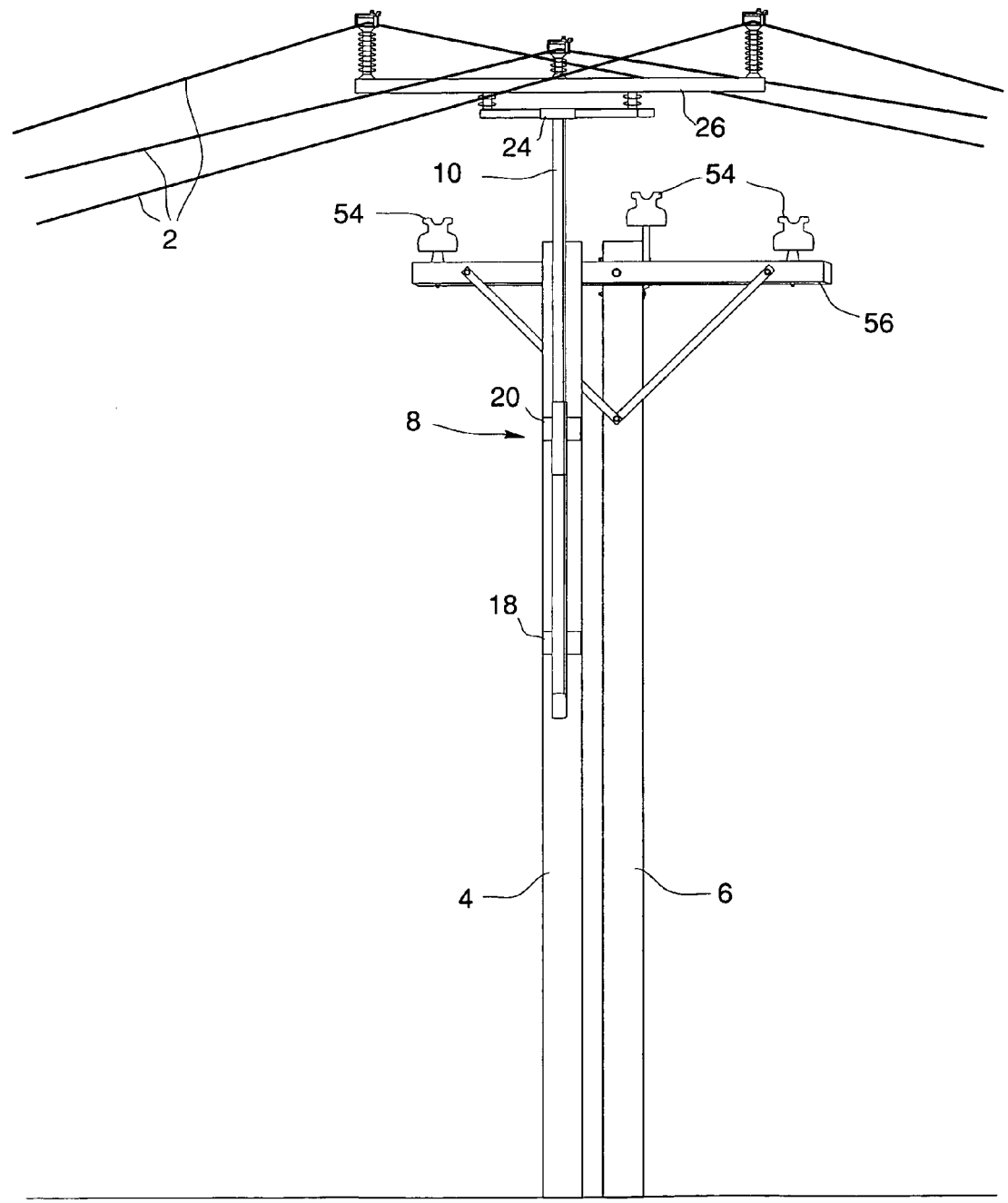

During transfer of a three-phase line, the manipulator is installed on the new pole 4 as illustrated in FIG. 5, and is then operated to "take" the conductors 2 on the old pole 6 as illustrated in FIG. 6, to lift the conductors as illustrated in FIG. 7, and to transfer them on the new pole 4 before being removed afterwards from the new pole 4.

The manipulator according to the invention facilitates and speeds up the work of linemen. The manipulator may for example be used during repair or modification of overhead distribution lines and in particular during replacement of a pole. The manipulator is not exclusively reserved for works to be made from a distance (i.e. with insulating sticks). It may also be used in combination with a bucket truck for manipulating three-phase line conductors if desired.

The manipulator may be used for the works under electrical live conditions requiring to lift the three conductors of a three-phase line, like the transfer of a line on a new pole, the replacement of the crossarm and/or insulators, etc. The manipulator may also be used to lift a medium voltage conductor of a single phase line unreachable to a bucket truck, such as in backyards.

Motorization of the manipulator allows the lifting and displacement of conductors 2 in a safe way and effortlessly for the lineman or the operator. As the works are carried out, the manipulator also plays the role of a temporary support for the conductors 2.

Referring to FIGS. 5 to 7, in locations unreachable to a bucket truck, the transfer of a three-phase line may be achieved as follows. The lifting assembly is hoisted up by means of a cable (not shown) passing in a pulley (not shown) fastened to the top of the new post. The saddles 18, 20 (or other types of elements forming the fastening assembly) are fastened to the pole 4, the upper saddle 20 being positioned far enough from the head of the pole 4 to not hinder the installation of the new crossarm. The transverse displacement assembly and the mobile element 26 are hoisted up and fastened to the lifting assembly, as illustrated in FIG. 5. By remote control of the displacement of the manipulator, the lineman inserts a conductor 2 in one of the conductor holders 32 and closes the door 42 thereof. The tie wires (not shown) of the involved conductor 2 are removed. The two last steps are repeated for both other conductors 2, as illustrated in FIG. 6 showing the taking of the center conductor 2 whereas the side conductors 2 have already been disengaged. The lineman moves away from the work area and remotely controls the lifting of the three phases in order to clear the work area, as illustrated in FIG. 7. The existing crossarm is dismantled. A crossarm (not shown) and insulators (not shown) are installed on the new pole 4. The lineman positions, using the manipulator, a conductor 2 above the insulator of the new conductor support hardware and put it down on this insulator. The conductor 2 is fastened to the insulator by tie wires (not shown). The conductor holder 32 is opened using an insulating stick and the conductor 2 is released. The three previous steps are repeated for both other conductors 2. The transverse displacement assembly including the second mobile element 26 is unfastened from the manipulator and is brought back to ground. The saddles 18, 20 are unfastened from the pole 4 and the lifting assembly of the manipulator is brought back to ground.

If the manipulator is used in combination with a bucket truck, the winch thereof may be used to hoist the manipulator up.

To install the crossarm and the insulators on the new pole 4, a sufficient clearing between the pole 4 and the manipulator must be considered to allow the lineman to climb up along the manipulator.

The mobile part 26 of the transverse displacement assembly may have ends provided with motorized extensions (not shown) carrying the end conductor holders 32 and moving along the transverse axis in order to extend the mobile part 26 or not.

The transverse displacement assembly may comprise a supplementary mobile arrangement (not shown) allowing moving the conductor carrier(s) 32 along another transverse axis with respect to the lifting axis, crosswise to the transverse displacement axis provided by the slide 24.

The lifting and transverse displacement assemblies preferably have manual actuation overrides (for example using a crank or a portable drill) in case of failure.

While embodiments of the invention have been illustrated in the accompanying drawings and described above, it will be evident to those skilled in the art that modifications may be made therein without departing from the invention.

The invention claimed is:

1. A manipulator for lifting at least one conductor of an energized electrical line from a pole, comprising:
   a lifting assembly having a first mobile element movable between a lowered position and a raised position;
   a first motor unit coupled to the lifting assembly so as to controllably move the first mobile element between the lowered position and the raised position;
   a fastening assembly for fastening the lifting assembly to the pole so that a displacement of the first mobile element follows a displacement axis parallel to the pole to which the lifting assembly is fastened;
   a transverse displacement assembly mounted on the first mobile element, the transverse displacement assembly having a second mobile element extending transverse to the first mobile element and movable along a transverse axis with respect to the displacement axis of the first mobile element, the second mobile element being provided with at least one upwardly projecting insulator and at least one conductor holder mounted on the at least one insulator for receiving the at least one conductor of the electrical line to be lifted and movable by the second mobile element along a course extending on opposite sides of the displacement axis of the first mobile element, wherein the second mobile element includes a lower member disposed on the first mobile element an upper member structurally supported by and spaced apart from the lower member, and at least one electrically insulating element extending between the lower member and the upper member and structurally connecting the upper member and the lower member, wherein the at least one upwardly projecting insulator, having the at least one conductor holder mounted thereon, is disposed on the upper member;
   a second motor unit coupled to the lower member of the second mobile element so as to controllably move the second mobile element along the transverse axis; and
   a control unit for controlling the first and second motor units.

2. The manipulator according to claim 1, wherein the lifting assembly comprises a telescopic arm having at least one upper member forming the first mobile element.

3. The manipulator according to claim 2, wherein the first motor unit comprises an endless screw arrangement extending in the telescopic arm, and a motor coupled to the endless screw arrangement for driving the endless screw arrangement in rotation, the at least one upper member of the telescopic arm being coupled to the endless screw arrangement so that a rotation of the endless screw arrangement produces a corresponding displacement of the at least one upper member between the raised position and the lowered position.

4. The manipulator according to claim 3, wherein the telescopic arm has a lower member receiving the motor.

5. The manipulator according to claim 1, wherein:
   the transverse displacement assembly comprises a guiding unit for the second mobile element along the transverse axis; and
   the second motor unit comprises an endless screw arrangement extending along the transverse axis, and a motor coupled to the endless screw arrangement for driving the endless screw arrangement in rotation, the second mobile element being coupled to the endless screw arrangement so that a rotation of the endless screw arrangement produces a corresponding displacement of the second mobile element with respect to the guiding unit.

6. The manipulator according to claim 5, wherein:
   the second mobile element receives the motor; and
   the endless screw arrangement extends in the second mobile element.

7. The manipulator according to claim 1, wherein:
   the lifting assembly comprises a stationary element carrying the mobile element; and
   the fastening assembly comprises pole saddles spaced from one another along the stationary element of the lifting assembly.

8. The manipulator according to claim 1, wherein the at least one conductor holder comprises a fork having an upper opening for receiving the at least one conductor, and a mobile closing element operable for selectively opening and closing the opening of the fork.

9. The manipulator according to claim 8, wherein the at least one conductor holder comprises a transverse roll in the fork for allowing an axial displacement of the at least one conductor in the at least on conductor holder.

10. The manipulator according to claim 1, wherein the upper member of the second mobile element forms a crossarm removably mounted on the at least one electrically insulating element.

11. The manipulator according to claim 1, wherein:
    the control unit comprises a remote control; and
    the first and second motor units are responsive to control signals transmitted by the remote control.

12. The manipulator according to claim 1, wherein:
    the at least one conductor comprises several conductors;
    the at least one insulator comprises at least as many insulators as the conductors, the insulators being spaced from one another at respective positions along the second mobile element; and
    the at least one conductor holder comprises as many conductor holders as the insulators, the conductor holders being mounted on the respective insulators.

13. The manipulator according to claim 12, wherein the respective positions of certain ones of the insulators on the second mobile element are adjustable.

14. The manipulator according to claim 12, wherein the insulators located at opposite ends of the second mobile element project higher than the other insulators.

15. The manipulator according to claim 1, wherein the lifting and transverse displacement assemblies have displacement ranges for the first and second mobile elements allowing a transfer of an energized electrical line between an old pole to be removed and a new pole for receiving the electrical line, disposed on a side of the old pole.

16. The manipulator according to claim 1, wherein movement of the second mobile element enables the at least one conductor holder to move transversely on the course along the transverse axis to the opposite sides of the displacement axis, and wherein a midpoint of the second mobile element is moveable along the transverse axis across the displacement axis to the opposite sides of the displacement axis.

* * * * *